July 2, 1940.  C. H. RASCH  2,206,122
STORAGE BATTERY
Filed July 23, 1937  2 Sheets-Sheet 1

INVENTOR
Carl H. Rasch,
BY
Beau, Brooks, Buckley & Bean
ATTORNEYS

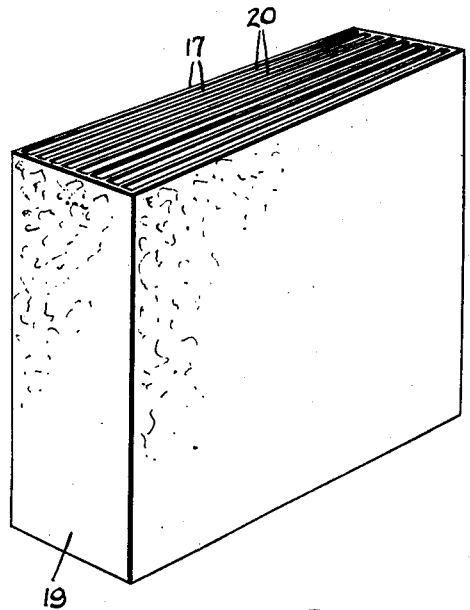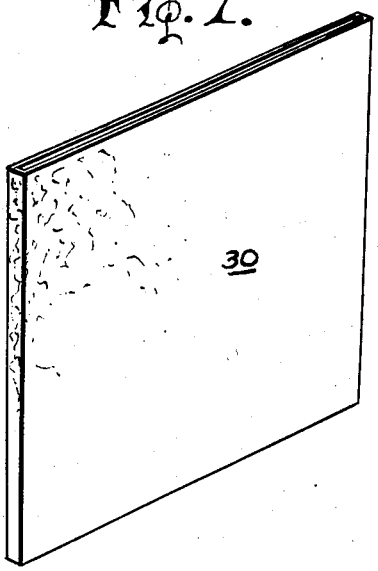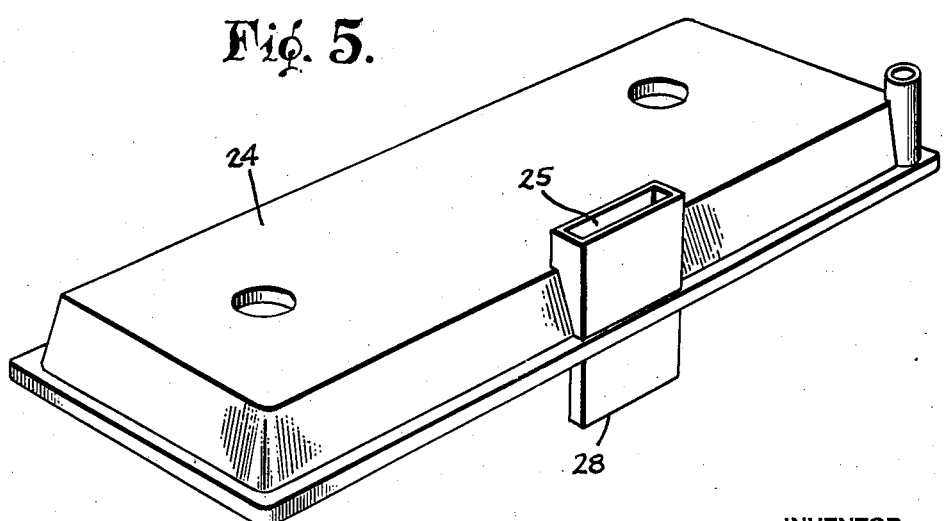

Patented July 2, 1940

2,206,122

UNITED STATES PATENT OFFICE 2,206,122

STORAGE BATTERY

Carl H. Rasch, North Tonawanda, N. Y.

Application July 23, 1937, Serial No. 155,252

5 Claims. (Cl. 136—6)

This invention relates to storage batteries and particularly to storage batteries provided with alternate electrodes of opposite polarity immersed in a liquid electrolyte, the electrodes being separated with an improved form of porous separator plate.

Heretofore storage batteries have been constructed by supporting active material, such as lead oxide, upon metallic grids, generally made of lead, to form a plate and the plates suspended in a container, alternate plates being electrically connected. It has also been suggested to provide separator plates between adjacent plates of thin sheets of porous material.

In all of these prior devices liquid communication was had between the various plate compartments of a cell and generally at the top of the plates. In a battery of this type during active duty, either during charging or discharging, motion and circulation of the electrolyte is generally upward due to (a) generation of heat and (b) generation of gas. In all batteries carrying active material upon a grid, there is a tendency for some of the active material to be dislodged from the grid and due to the general upward circulation of electrolyte to be carried to one of the plates, deposit and build up there and short circuit the electrodes and thus destroy the effectiveness of the cell or battery.

It is an object of my invention to provide a battery or cell provided with alternate electrodes of opposite polarity and immersed in an electrolyte but wherein no liquid communication is had between the electrolyte surrounding the separate electrodes excepting through the porous separator plates. It is a further object of the invention to provide porous separator plates of improved character and composition, the plates extending above the electrolyte level of the cell and effectively isolating the plate and surrounding electrolyte from that next adjacent.

In the drawings:

Fig. 5 is a view in perspective of one of the cover elements of the device;

Fig. 6 is a perspective view of a separator plate unit for one cell.

Fig. 7 is a view in perspective of a modification comprising a single pocket formed as a separate unit.

Figure 1:
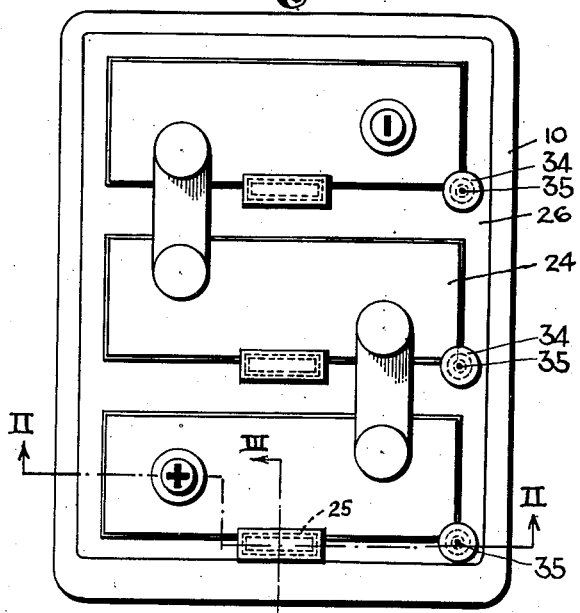
Fig. 1 is a plan view of the improved battery.

Referring more particularly to the drawings, a battery container 10 is formed with convenient cell compartments 11. Alternate grids carrying active material form plates 12 of like polarity which are all electrically connected to post 14, while the remainder of the grids, likewise carrying active material, form plates 13 of like polarity but of a polarity opposite to plates 12. Plates 13 are likewise all electrically connected to post 15, posts 14 and 15 forming the positive and negative electrodes respectively of cell 11.

Between adjacent plates 12 and 13 are positioned porous separator plates 17 permitting free passage of electrical energy but restricting the flow of solution laden with active material. In general the separator plates may be made of material resisting chemical action of the electrolyte and inert toward the active material. In addition, the separator plates must be sufficiently porous to permit of the necessary energy transfer but be impervious to active material and of sufficient strength to withstand the shocks incident to use and maintain their shape and position without warping or pulling loose. The composition of the separator plates will be discussed more fully hereinafter.

Figure 4:
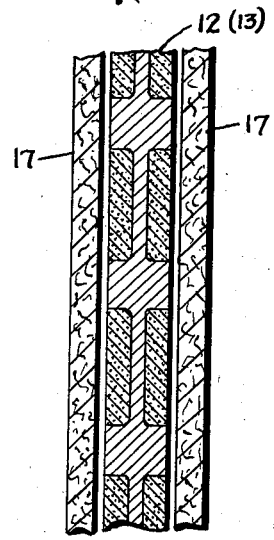
Fig. 4 is an enlarged fragmentary view in cross section showing a plate and adjacent separator plates.
Figure 2:
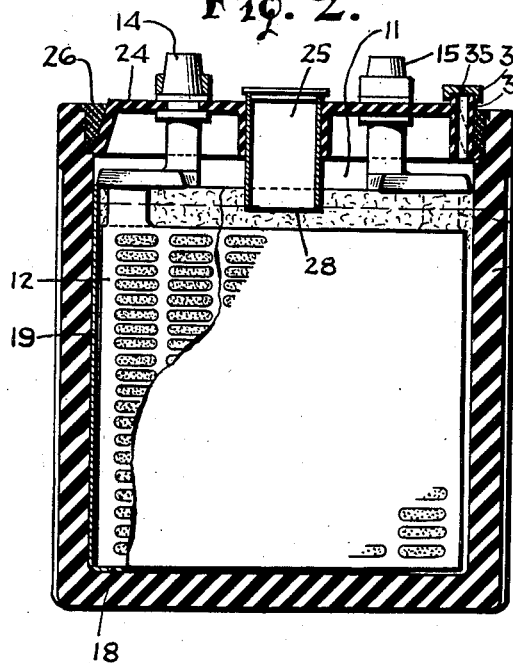
Fig. 2 is a cross section substantially on line II—II of Fig. 1.
Figure 3:
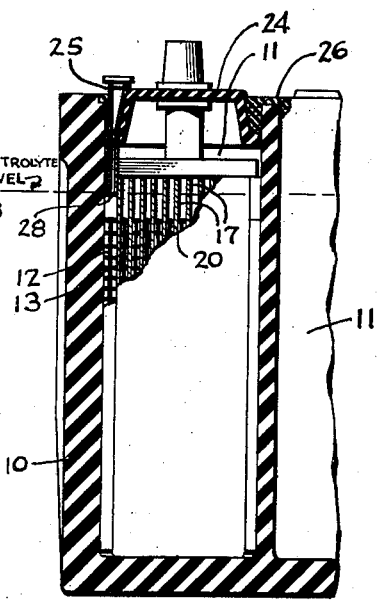
Fig. 3 is a fragmentary cross sectional view with certain parts in elevation taken substantially on line III—III of Fig. 1.

In general, each cell is provided with a separator plate unit formed with a bottom 18 and side walls 19 with the separator plates 17 formed integrally with two opposite side walls, plates 17 being spaced apart a sufficient distance so that the intervening space 20 between two adjacent separator plates or between a separator plate and an end wall will accommodate a grid bearing active material such as plates 12 or 13. So far as the invention is broadly concerned, the separator plates 17 need be spaced apart only a sufficient distance to accommodate the electrodes. Some clearance is shown in Fig. 4 and this clearance is shown as being on both sides of the electrode. This could be accomplished, if desired, in conventional ways such as by having marginally extending spacers but that feature is not important in the present case. The tops of the separator plates 17 extend upwardly in close proximity to the cover member 24 of the cell and above the tops of plates 12 and 13. Cover member 24 is bonded or cemented to the side walls with suitable cement 26 to form an hermetically sealed joint. The cell is completed by adding to each compartment and therefore, surrounding each plate 12 or 13 with appropriate electrolyte, maintaining the height of the electrolyte below the top of the separator plates.

Means are provided in connection with the battery for preventing the addition of so much liquid to the cell that free fluid communication is had between adjacent compartments except through the porous separator plates. In the specific modification of the invention shown in the drawings, a liquid intake conduit 25 is provided in the top of the cell extending downwardly into the cell below the tops of the separator plates 17. The lower end 28 of conduit 25 is of such shape and dimensions that it will extend into a compartment formed by two adjacent separator plates or by a side wall and a separator plate.

Access is had to a cell of the battery for determining the gravity thereof through suitable ports 33 located in the cover portion or top of the cell or battery. Port 33 is provided with a cover 34 removably secured thereto in which a breather hole 35 permits escape of gas generated in the cell thereby preventing excessive backing up of liquid in the liquid supply conduit 25.

Liquid is added to the cell by covering breather hole 35 and port 33 and introducing the liquid through conduit 25. The added liquid passes through the porous separator plates and fills the cell to a level substantially coincident with lower end 28 of conduit 25. With breather hole 35 closed, additional liquid backs up in conduit 25 since top 24 is hermetically sealed to the side walls.

In another form of the invention single plate pockets 30, one of which is illustrated in Fig. 7, are formed to fit a cell and are placed therein generally in spaced apart relation with plates of one polarity placed within the pockets and plates of the opposite polarity placed between adjacent pockets or between a side wall and a pocket.

The preferred composition of the porous separator plates or pockets is one not attacked by the electrolyte and I prefer to use vegetable fibers of substantially high tensile strength bonded with a suitable cementing and bonding agent permitting porosity, yet of considerable strength. To this end vegetable fibers such as bagasse, ramie, jute, cocoanut fibers and the like are admirably suited when bonded with substances such as casein and the like. The fibers freed of dirt and foreign matter are impregnated with the casein and molded under pressure to the desired shape and dimensions. This molded form is then subjected to the action of a hardening agent such as formaldehyde, as, for instance, by dipping into the formaldehyde solution or spraying. The treated forms are then permitted to dry and harden.

What is claimed is:

1. A wet battery cell comprising a series of electrodes, alternate electrodes being of one polarity and connected to a terminal, the remaining electrodes being of opposite polarity and connected to another terminal, said electrodes carrying electro-chemically active material, porous separator plates extending between opposite side walls of the cell and positioned between adjacent electrodes, said separator plates extending above the bodies of said electrodes, liquid electrolyte in said cell and means for initially establishing the electrolyte level below the tops of said separator plates and above the tops of said electrodes.

2. A wet battery cell comprising a series of electrodes, alternate electrodes being of one polarity and connected to a terminal, the remaining electrodes being of opposite polarity and connected to another terminal, said electrodes carrying electrochemically active material, porous separator plates extending between opposite side walls of the cell and positioned between adjacent electrodes, said separator plates extending above the bodies of said electrodes, liquid electrolyte in said cell, a top for said cell hermetically sealed thereto, and means for initially establishing the liquid level of said electrolyte below the tops of said separator plates.

3. A wet battery cell comprising a series of electrodes, alternate electrodes being of one polarity and connected to a terminal, the remaining electrodes being of opposite polarity and connected to another terminal, said electrodes carrying electrochemically active material, porous separator plates extending between opposite side walls of the cell and positioned between adjacent electrodes, said separator plates extending above the bodies of said electrodes, liquid electrolyte in said cell, a top for said cell hermetically sealed thereto, a liquid intake conduit positioned in said top, and means associated with said conduit for initially establishing the electrolyte level below the tops of said separator plates.

4. A wet battery cell comprising a series of electrodes, alternate electrodes being of one polarity and connected to a terminal, the remaining electrodes being of opposite polarity and connected to another terminal, said electrodes carrying electrochemically active material, porous separator plates extending between opposite side walls of the cell and positioned between adjacent electrodes, said separator plates extending above the bodies of said electrodes, liquid electrolyte in said cell, a top for said cell hermetically sealed thereto, and a liquid intake conduit positioned in said top and extending below the upper edge of said separator plates and forming with said top an air trap for automatically initially establishing the liquid level of said electrolyte below the tops of said separator plates.

5. A wet battery cell comprising an electrode of one polarity, another electrode of opposite polarity, electrolyte in said cell, said electrodes carrying electrochemically active material, a partition wall extending across the cell and forming a pocket for the reception of one of the electrodes, said wall being permeable to the electrolyte but impermeable to said active material, said wall extending above the bodies of the electrodes, and means in fluid communication with the electrolyte below the top of said partition wall for establishing the liquid level of the electrolyte in the cell below the top of said partition wall.

CARL H. RASCH.